April 8, 1924. 1,489,579
R. C. HAWKINS
PLOW ATTACHMENT FOR TRACTORS
Filed Aug. 22, 1921 2 Sheets-Sheet 2
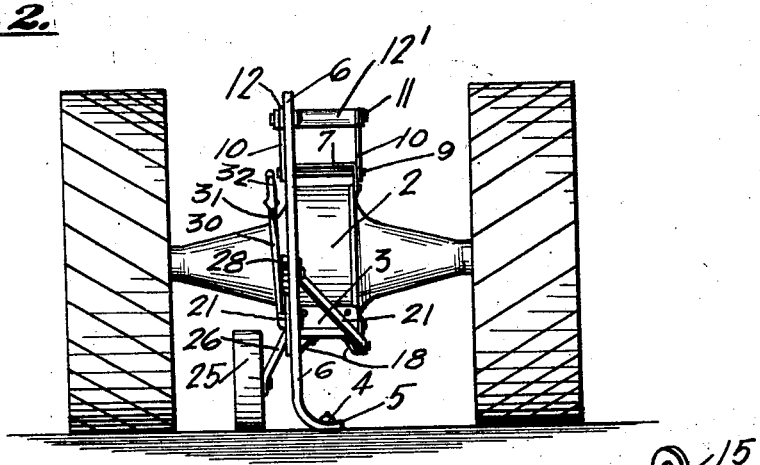
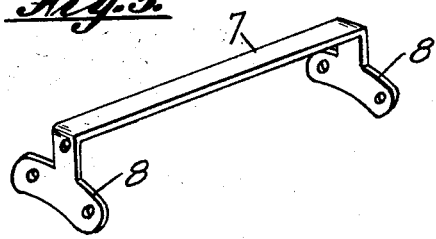
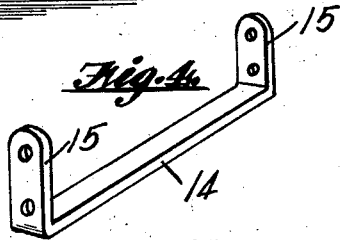
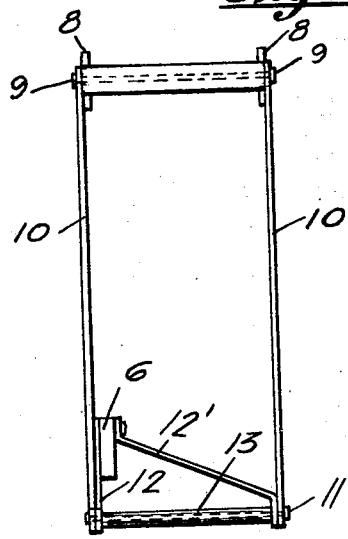
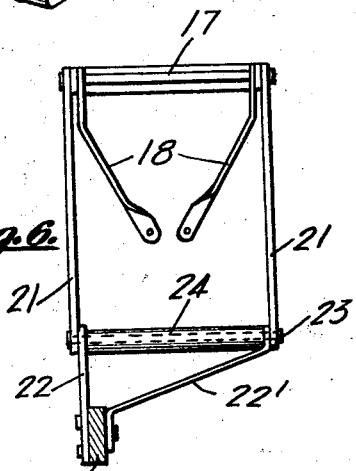
INVENTOR.
Roe C. Hawkins
BY
Hazard & Miller
ATTORNEYS.

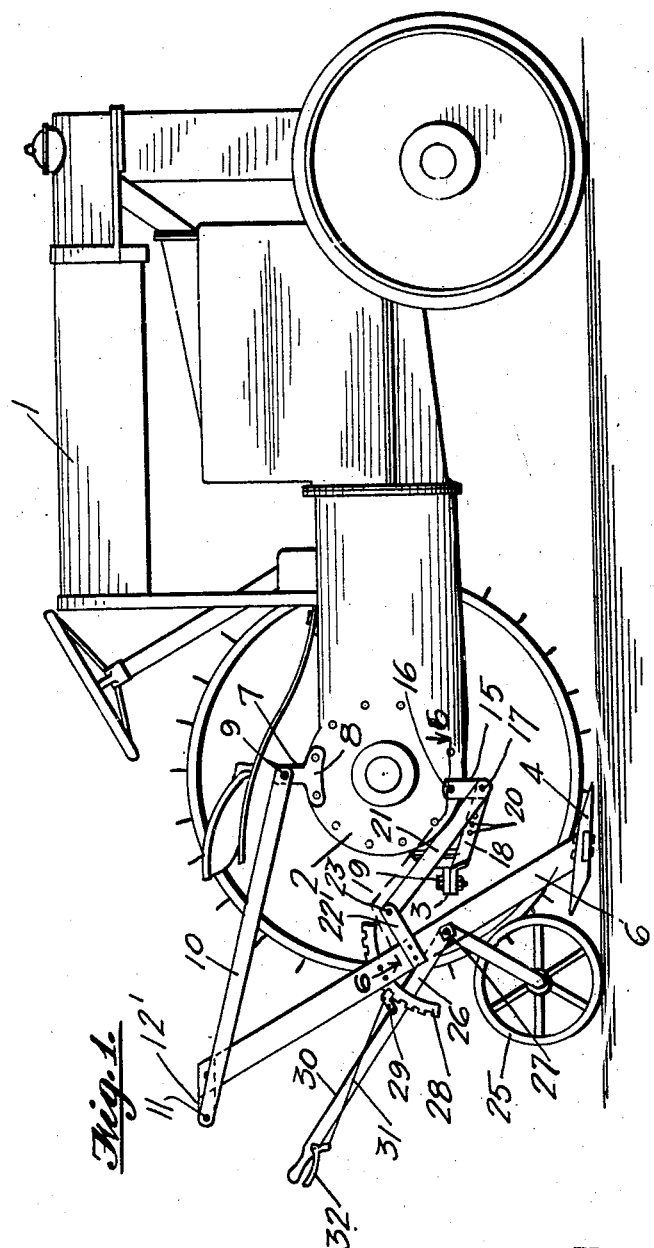

Patented Apr. 8, 1924.

1,489,579

UNITED STATES PATENT OFFICE.

ROE C. HAWKINS, OF LONG BEACH, CALIFORNIA.

PLOW ATTACHMENT FOR TRACTORS.

Application filed August 22, 1921. Serial No. 494,314.

*To all whom it may concern:*

Be it known that I, ROE C. HAWKINS, a citizen of the United States, residing at Long Beach, in the county of Los Angeles and State of California, have invented new and useful Improvements in Plow Attachments for Tractors, of which the following is a specification.

This invention relates to plow attachments for tractors and more particularly to an attachment adapted for beet plowing and has for its object to provide a simple and novel construction by which the attachment can be readily applied to a standard commercial type of tractor now on the market without altering the construction of the tractor in any way.

Another object is to provide a plow support that will be kept in natural alinement due to the force exerted on the plow having contact with the earth.

A further object is to provide a simple means whereby the depth of the plow may be readily adjusted.

The invention will be readily understood from the following description of the accompanying drawings in which:

Fig. 1 is a side elevation of a tractor with a rear wheel removed and showing the attachment applied.

Fig. 2 is a rear end elevation of the tractor and attachment applied to the same.

Figs. 3 and 4 are perspectives of brackets adapted to be applied to the differential.

Fig. 5 is a plan view showing the links connecting the tractor and the plow support, none of the tractor being shown.

Fig. 6 is a view taken on line 6—6 to show the links for connecting the under side of the tractor with the plow support, none of the tractor being shown.

The plow attachment is shown applied to a well known type of tractor 1 having a differential casing 2 and a draw bar cap 3 fastened to the rear end of the casing. A plow 4 is attached to the lower horizontally curved portion 5 of the plow support 6, which is shown as extending rearwardly and upwardly and which is held to the differential casing by suitable linkage construction. This construction comprises a transverse bracket 7 applied above the center of the casing 2 by bolts passed through lugs 8 formed on the bracket 7, these bolts being part of the regular construction of the tractor. Journaled in the bracket 7 is a rod 9 and connected therewith are compression links 10 extending rearwardly and upwardly and journaled upon the same. The upper ends of the links 10 are shown as having a second rod 11 journaled therein and tension links 12 and 12' extending thence to the upper end of the plow support 6. The link 12' is offset to allow the plow support to be positioned to one side of the longitudinal center so that the plow will be in the center. A suitable spacing member such as a piece of pipe 13 is positioned on the shaft 11 between the links 12 and 12'.

A second pivotal connection between the tractor and plow support is positioned intermediate of the ends of the support and comprises a second transverse bracket 14 fastened below the center and to the under side of the casing 2 by having a casing bolt 16 pass through upwardly extending portions 15. Journaled in the bracket 14 is a shaft 17 having rearwardly and inwardly extending draw bar cap links 18 journaled thereon at one end and fastened at the other end to the draw bar cap 3 as by a bolt 19. In the forward ends of these links are a plurality of holes 20 for adjusting the vertical angle of the plow support. A second set of tension links 21 are also journaled upon the shaft 17 and extend rearwardly to a set of converging links 22 and 22' with a shaft 23 pivotally connecting the same to the links 21, the link 22' being offset to keep the plow support in a vertical position. The opposite ends of the links 22 and 22' are rigidly fastened to the support 6 and are spaced at their other end by a member such as a piece of pipe 24 positioned upon the shaft 23 between the two links.

In order to readily elevate and lower the plow suitable means are provided having a gage wheel 25 journaled upon a bell crank lever 26 pivoted upon the plow support as at 27. Means for holding the gage wheel at any position is provided by having an arcuate ratchet segment 28 rigidly fastened to the support 6 and a pawl 29 pivotally connected to the handle portion 30 of the bell crank and having a link 31 actuated by a hand operated bell crank 32.

In the operation the gage wheel is raised accordingly to the depth to be plowed and as the plow engages the ground the plow support has a tendency to be forced rearwardly which immediately places the links 22, 22' and 21 under tension and the support will tend to pivot around these links so as to cause the links 12 and 12' to be placed under tension and it is obvious that the plow support would then have a natural tendency to be kept in longitudinal alinement with the tractor. If a greater adjustment of the plow is desired than can be obtained by the pawl and ratchet the rod 17 is removed and the bracket 14 is pivoted rearwardly around the bolt 16 so that the rod 17 can be passed through one of the other adjusting holes 20 and the rods 21 are thereby forced backward causing the support 6 to have a new initial set position.

Various changes in the details of construction of my invention may be made by those skilled in the art without departing from the spirit of my invention as set forth in the appended claims:

What is claimed is:

1. An earthworking attachment for tractors or the like comprising a support extending rearwardly and upwardly and an earthworking element carried by the same, converging links fastened intermediate the ends of said support for holding the same in position, and compression means at the upper end of said support, whereby said links are under tension, to hold said support in normal alignment with the tractor.

2. An earthworking attachment for tractors or the like comprising a support and earthworking element carried by the same, transverse brackets adapted to fasten to the upper and under side of the axle casing, connections between said lower bracket and draw bar cap carried by said casing, connections between said brackets and support, means for adjusting the depth of said element, and means for adjusting the inclination of the element to the ground.

3. In combination, a vehicle, an earth working element, a support for the element extending rearwardly and upwardly, an upper set of links pivotally connected to the vehicle and to an element connected with the top of said support, a lower set of links pivotally connected to an intermediate part of the support and adjustably associated with the vehicle, the pivots of all of said links being horizontally disposed whereby when the element engages the ground during the forward movement of the vehicle the support is held in longitudinal alinement with the vehicle although vertically adjustable.

4. In combination, a tractor including a differential casing, a support, an earth working element carried by the support, and means pivoted at a plurality of points above and below the center of and on the casing for movably sustaining the support in off-set position with relation to the casing and in such manner that normal alignment with the tractor shall be maintained regardless of rearward pressure exerted on the said element.

5. An earth working attachment for tractors comprising brackets adapted to be secured to the axle casing of the tractor, an earth working element, a support for the element, a set of links pivotally associated with one pair of the brackets and with said support, a second set of links pivotally and adjustably associated with another pair of the brackets, and with said support, the mounting of said links with the brackets and support being such that when rearward pressure is exerted on the element, the support will be actuated to exert a tension on the last mentioned links while maintaining the support in normal alinement with the tractor.

6. An earth working attachment for tractors comprising brackets adapted to be secured to the axle casing of the tractor, an earth working element, a support for the element, a set of links pivotally associated with one pair of the brackets and with said support, a second set of links pivotally and adjustably associated with another pair of brackets and with said support, a gage wheel adjustably mounted on the support, and means for securing the wheel in any adjusted position.

7. An earthworking attachment for tractors or the like comprising a support, an earthworking element carried by the support, brackets adapted to be secured to the upper side of an axle casing, pivoted connections between the brackets and said support, other brackets adapted to be secured to the draw bar cap on the axle casing, and pivoted connections between the second brackets and said support.

8. In combination, a vehicle including an axle casing, a draw bar cap mounted on the casing, a plurality of pairs of brackets respectively secured to the casing and cap, a vertically disposed support, an earth working element carried by the support, and links pivotally connected to the bracket and to the support to allow vertical movement of the support, said links being arranged in sets, with the links of each set rigidly held in spaced relation to each other to prevent lateral movement of the support and consequently the earth working element.

9. In combination, a vehicle including an axle casing, a draw bar cap mounted on the casing, a plurality of pairs of brackets respectively secured to the casing and cap, a vertically disposed support, an earth working element carried by the support, links pivotally connected to the bracket and to the support to allow vertical movement of the support, said links being arranged in sets, with the links of each set rigidly held in spaced relation to each other to prevent lateral movement of the support and consequently the earth working element, and means for varying the vertical position of the element comprising a wheel sustained for swinging movement on the support, manually operable means for swinging the wheel to any adjusted position, and means for locking said means in any position.

In testimony whereof I have signed my name to this specification.

ROE C. HAWKINS.